INVENTOR.
ROBERT P. LEWIS

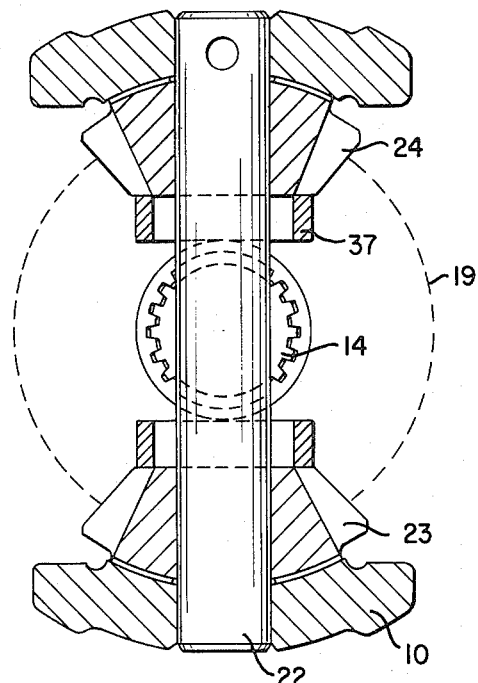
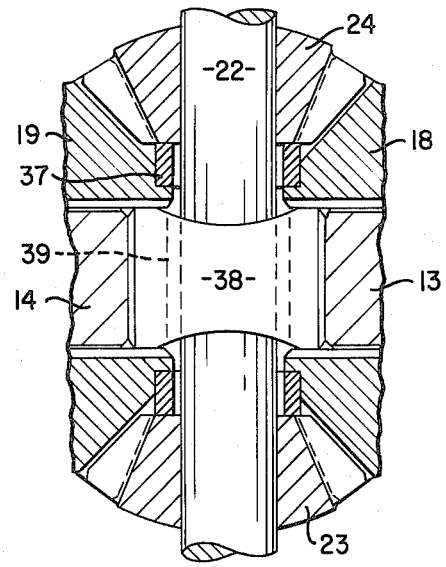
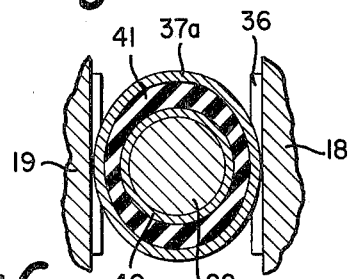
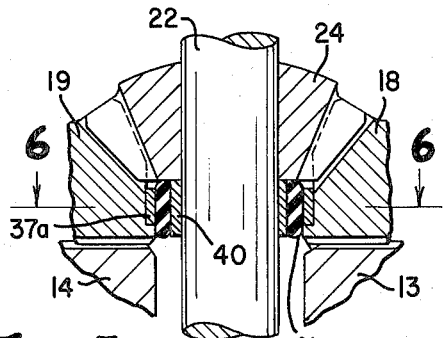
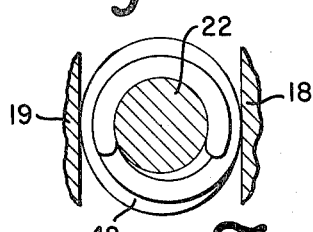
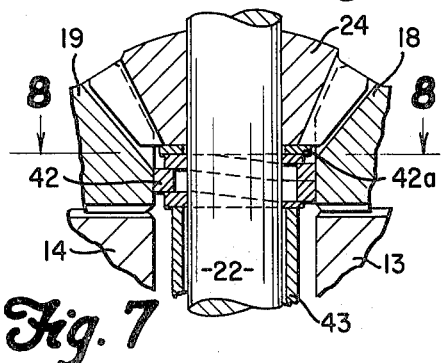

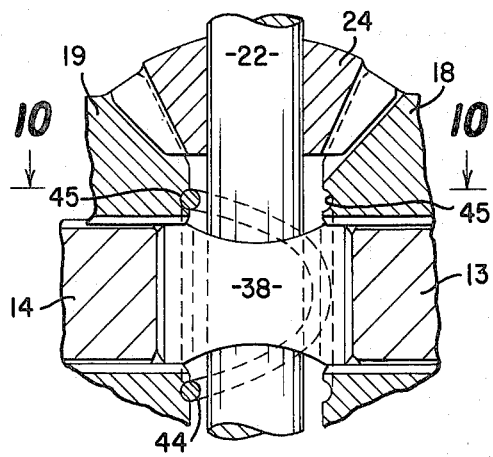
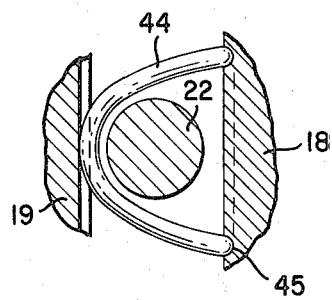
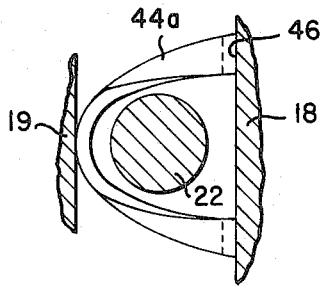
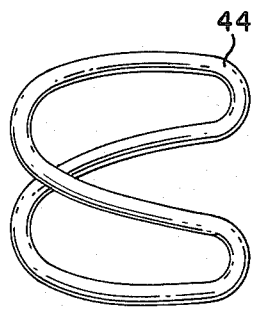
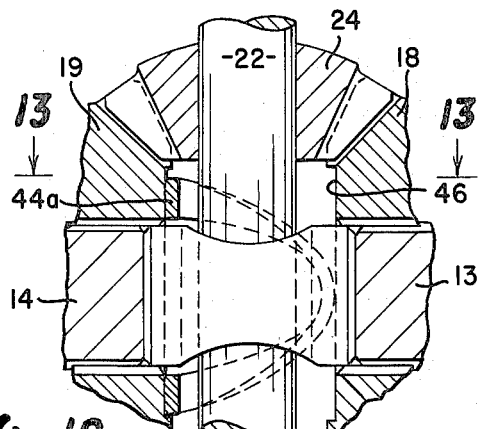

Sept. 28, 1965  R. P. LEWIS  3,208,306
DIFFERENTIAL GEARING
Filed April 5, 1962  4 Sheets-Sheet 4

INVENTOR.
ROBERT P. LEWIS
BY
Malcolm W. Fraser
ATTORNEY

United States Patent Office 3,208,306
Patented Sept. 28, 1965

3,208,306
DIFFERENTIAL GEARING
Robert P. Lewis, 2256 Densmore Drive, Toledo, Ohio
Filed Apr. 5, 1962, Ser. No. 185,298
7 Claims. (Cl. 74—711)

This invention relates to differential mechanisms but more particularly to differential mechanism for use in automotive vehicles for driving a plurality of wheels from a single source of power.

When the two driving wheels of an automotive vehicle have equal traction, the conventional differential is satisfactory. This condition does not obtain when one wheel, for example, encounters an icy surface, because the wheel having traction loses its driving power, and the other wheel spins freely. Thus the vehicle cannot advance until traction is afforded for the slipping wheel. Another disadvantage is that if one wheel hits a bump hard enough to leave the road, it will accelerate, and when it again contacts the road, tire scuffing results.

To remedy the above difficulties a number of differential mechanisms have been developed, and, although some have operated with a certain degree of satisfaction, most of them either are too complicated, are uneconomical from a cost or service standpoint, or have inherent objections from a mechanical or design aspect.

An object is to produce a differential mechanism having new and improved features of construction and operation which are effective in retarding the differential action of the differential gearing when one axle is spinning relative to the other.

Another object is to produce a differential mechanism having a limited and varying amount of retarding action to the rotation of the different gearing, thereby providing a large transfer (bias) ratio when there is a big difference in traction between the two vehicle wheels, and providing automatically, a smaller transfer ratio when there is a small difference in traction, thereby not interfering with the steering or handling of the vehicle.

A further object is to produce a simple, low cost, compact and light weight design of a limited slip differential, employing many of the same parts and tooling from conventional differentials and to be interchangeable therewith.

A still further object is to produce novel, economical and easily assembled preload applying means for a limited slip differential of such design as to eliminate the commonly used springs and spring retainers, and to afford adequate clearance at the center of the differential for the use of any type of axle shaft thrust bearing.

A still further object is to produce simple and efficient spring thrust means imposed directly against the differential side gears to cause the latter to exert axial pressure against multiple disc clutch means for achieving the desired retarding action in a limited slip differential.

Other objects and advantages of the invention will hereinafter appear and for purposes of illustration but not of limitation, embodiments of the invention are shown on the accompanying drawings in which FIGURE 1 is a sectional plan view of the differential mechanism showing one of the embodiments of my invention;

FIGURE 3 is a sectional view substantially on the line 3—3 of FIGURE 1 showing particularly the openings in the sides of the one piece case through which the parts may be assembled;

FIGURE 4 is a fragmentary sectional view of the structure shown in FIGURE 1 but in addition showing a thrust block interposed between the axle shafts;

FIGURE 5 is a fragmentary sectional view of an alternate form in which rubber is bonded respectively to the ring spring and an inner bushing;

FIGURE 6 is a sectional view substantially on the line 6—6 of FIGURE 5;

FIGURE 7 is a fragmentary sectional view showing another alternate form of the invention involving side loaded helical springs;

FIGURE 8 is a section substantially on the line 8—8 of FIGURE 7;

FIGURE 9 is a fragmentary sectional view of a further modification of the invention involving the use of a double loop or arch spring;

FIGURE 10 is a sectional view substantially on the line 10—10 of FIGURE 9;

FIGURE 11 is a perspective view of the double loop or arch spring shown in FIGURES 9 and 10;

FIGURE 12 is a fragmentary sectional view of another modified form somewhat similar to that shown in FIGURES 9 to 11 except instead of using round wire, this embodiment makes use of a flat wire loop or arch spring;

FIGURE 13 is a sectional view substantially on the line 13—13 of FIGURE 12;

Figure 1:
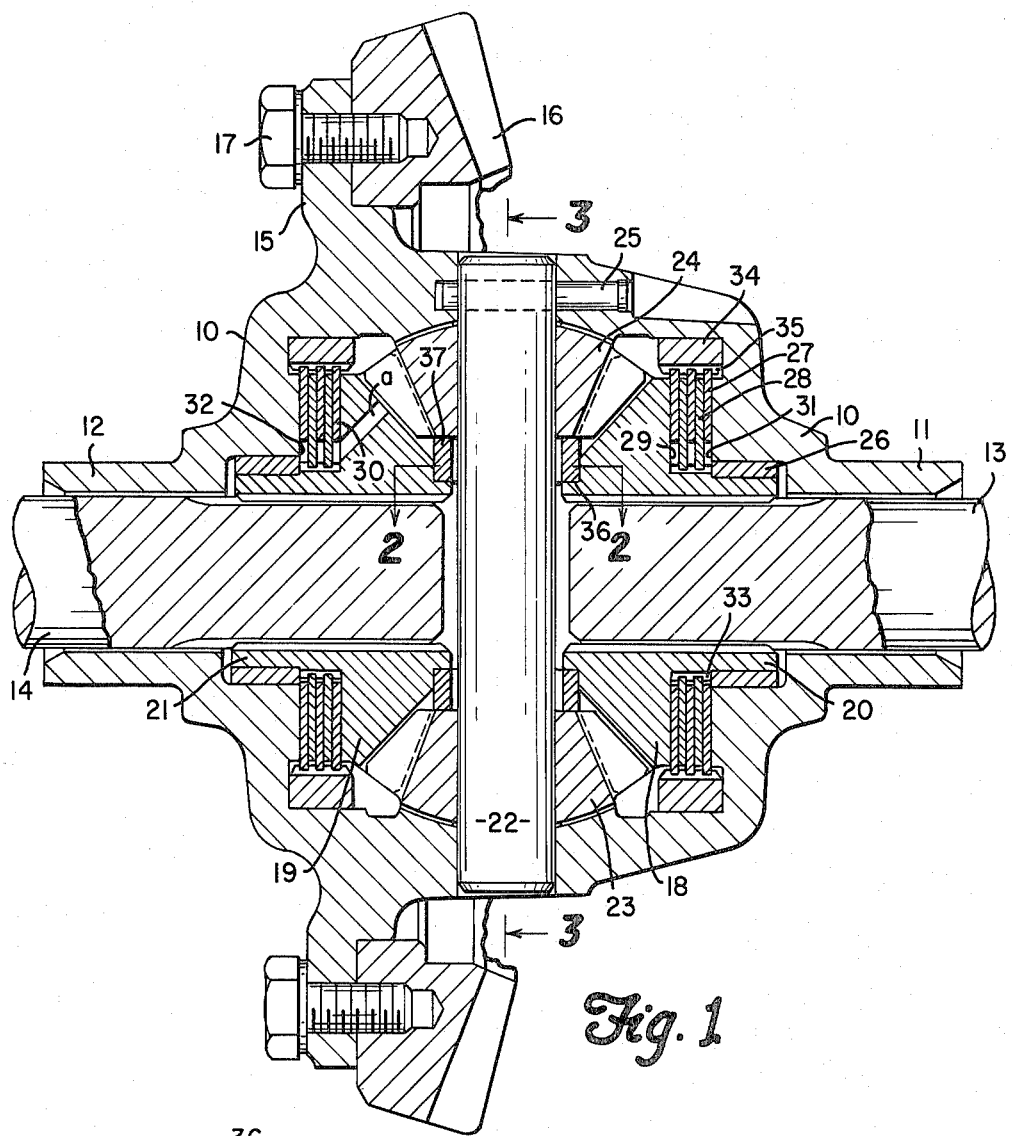
Figure 2:
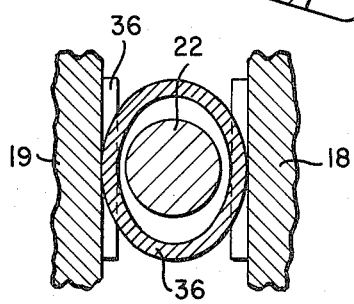
FIGURE 2 is a sectional view substantially on the line 2—2 of FIGURE 1.

The illustrated embodiment of the invention comprises a one piece case 10 provided with outwardly extending hubs 11 and 12 in which axle shafts 13 and 14 are disposed for rotation. It will be understood that the axle shafts 13 and 14 are connected in the usual manner at their outer ends to the driving wheels of a vehicle provided with this differential. A ring gear 16 is secured by bolts 17 to a peripheral flange 15 on the case 10. As will be readily apparent to those skilled in this art, the case 10 is arranged within a differential housing (not shown) carrying the usual supply of lubricant for the differential.

Arranged within the case 10 is a pair of aligned side gears 18 and 19 disposed in axially spaced facing relation. The side gears 18 and 19 are formed with hubs 20 and 21 respectively and are splined to receive mating splines on the axle shafts 13 and 14 respectively. Pressed-in bushings 26 in the case provide bearings for the hubs 20 and 21, and also as a means for retaining the clutch discs 27 and 28 during assembly and diassembly.

A pinion shaft 22 extends diametrically through the case 10 in the space between the side gears 18 and 19 and mounted on opposite end portions of the shaft 22 for rotation thereon are bevel pinion gears 23 and 24. A pin 25 in the case 10 extends through an end portion of the shaft 22 and fastens the shaft to the case. It will be apparent that the bevel gears 23 and 24 mesh with each of the side gears 18 and 19.

Clutch means is disposed between each of the side gears 18 and 19 and the case 10 for retarding the relative rotation of the gears, thereby to retard the compensating action. As shown sets of interleaved clutch plates 27 and 28 are interposed between both flat faces 29 and 30 of the side gears 18 and 19 respectively. On the other side of the clutch plates are opposing flat walls 31 and 32 respectively of the case 10. A series of external splines or teeth 33 on the hub of each of the side gears 18 and 19 receive the notched ends of the clutch plates 28 and pressed in rings 34 having internal ribs or teeth 35 receive the notched ends of the clutch plates 27. The clutch plates 27 and 28 may be constructed in accordance with the teachings of my patent No. 3,025,686 dated March 20, 1962, and receive lubricant through passages formed in each of the side gears from the forcing action of the teeth of the pinions 23 and 24.

The inner side of each of the side gears 18 and 19 is provided with shoulder portions 36 and disposed in these shoulder portions and bearing against the ends of the pinions 23 and 24 respectively are ring springs 37, which, as shown in FIGURES 1 to 4, surround the pinion shaft 22 and are spaced therefrom. The shoulder portions 36 locate the ring springs 37 about the pinion shaft 23. The rings are under compression and exert oppsite forces against the side gears 18 and 19 causing the latter to apply equal pressure on the clutch plates 27 and 28. It will be understood that the ring springs 37 are of one piece spring metal and, inasmuch as they are placed under compression, they are out of round. In the form shown, each ring spring is of flat metal and rotates with the respective pinion around the pinion shaft 22 when the differential gears are rotating, thus avoiding any sliding friction between the contact surface of the spring and side gear. Inasmuch as the direct rotation of the side gears, relative to the pinion shaft, is opposite to each other, the ring springs 37 automatically seek their own center or exert only a minimum amount of pressure against the shaft when locating themselves. It will be manifest that the ring springs establish a predetermined positive preload on the clutch means.

From the above it will be apparent that I have produced a combined-positive preloaded relative slip type differential in which the constant preload force is always supplemented by the axial force from the side gears 18 and 19 relative to the input driving torque whenever this is greater than the preloaded torque limit, or whenever the differenial gears are in relative rotation with each other, thereby increasing the retarding action to the rotation of the differential gears. This makes it possible automatically to obtain a large transfer ratio whenever there is a large difference in traction between the two vehicle wheels, when it is most needed for mobility, then dropping to a smaller transfer ratio whenever the difference in traction is small so as not to interfere with the steering or handling of the vehicle.

Reference is made to FIGURE 3 of the drawing illustrating the wide opening in the case 10 which enables assembly of the parts readily and conveniently. For example, the side gears 18 and 19 respectively along with the associated clutch plates can be assembled as a unit through the wide opening provided in the case 10. In this manner a subassembly can be formed which is extremely practical from the standpoint of ease in assembly and for maintenance purposes.

FIGURE 4 shows substantially the structure above described but in addition there is provided a thrust block 38 which is interposed between the axle shafts 13 and 14. As shown the thrust block 38 has a transverse opening 39 through which the pinion shaft 22 freely extends. Thus in the use of the preload ring springs 37 ample space is provided for the utilization and the convenient mounting of the thrust block 38.

An alternate form is shown in FIGURES 5 and 6 in which a metallic spring ring 27a is mounted and, as shown, is placed under stress so that it is normally out of round. In association with the ring spring 37a is an inner ring or bushing 40 which has a nice fit with the pinion shaft 22 for rotation thereabout. Interposed between the rings 40 and 37a is a synthetic rubber ring 41 which is suitably bonded to the adjacent rings.

This structure has the advantage of increasing the lateral pressure against the clutch discs by added compression and tension of the rubber. It has the additional advantage of affording positive means for centering the spring relative to the pinion shaft 22.

In the alternate form shown FIGURES 7 and 8 a side loaded helical coil spring 42 is illustrated and as shown the spring is mounted about the pinion shaft 22. Interposed between the two helical coil springs 42 is a spacer sleeve 43 mounted on the pinion shaft 22. The side loaded coil spring 42 as shown is of square wire and has the advantage of applying increased load and deflection. Furthermore this form of ring spring has a self centering feature. It will be observed that it bears in opposite directions against flat surfaces on the adjacent side gears 18 and 19 and at one end it abuts against the spacer sleeve 43. At the opposite end the ring spring 42 abuts against a washer 42a which bears against the inner end of the adjacent pinion.

In the embodiment of the invention shown in FIGURES 9 and 10 a double arch or loop type spring 44 is interposed between the side gears 18 and 19 imparting equal opposing pressures thereto. As shown suitable circular grooves 45 are formed in the adjacent surfaces of the side gears to receive and retain the loop of the spring. As shown the loop spring 44 as indicated in FIGURE 11 is composed of two C portions integrally joined by curved end portions with the loops spaced laterally from each other. The loop spring partially embraces the pinion shaft 22 and is of round wire consisting of an endless piece. This spring does not rotate but a sliding friction is imposed between this ring gear and the side gears 18 and 19. It is radially located by the pinion shaft 22 and is such as to afford necessary clearance for the thrust block 38 interposed between the adjacent ends of the axle shafts 13 and 14. Manifestly this provides an exceedingly simple and economical arrangement for applying the preload and may be assembled in a simple and convenient manner.

The form shown in FIGURES 12 and 13 is similar to that shown and described in connection with FIGURES 9 to 11 except that the loop spring is formed of flat wire as indicated at 44a. The spring 44a abuts against flat surfaces 46 formed on the adjacent surfaces of the side gears 18 and 19.

Figure 14:
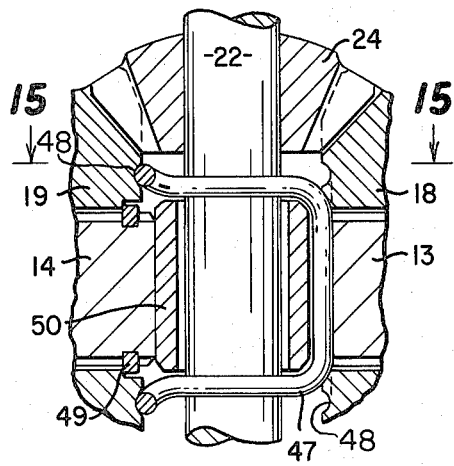
FIGURE 14 is a fragmentary sectional view of a still further modification showing a double arch spring, one of the axle shafts being provided with a C-type thrust washer, and an associated thrust block; which may be assembled or removed without disturbing the spring.
Figure 15:
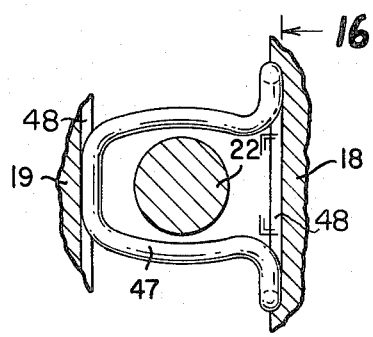
FIGURE 15 is a sectional view substantially on the line 15—15 of FIGURE 14 with the axle shaft and thrust block not shown.
Figure 16:
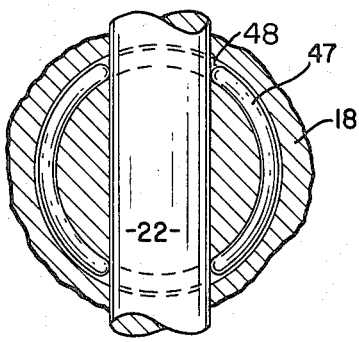
FIGURE 16 is a sectional view substantially on the line 16—16 of FIGURE 15.

FIGURES 14 to 16 illustrate another alternate form in which a double arch spring 47 is employed. As shown appropriate circular grooves for the reception of the spring are indicated at 48 in each of the side gears. Although the spring is shown of round wire, it should be understood that it may be made of flat wire, if desired. It will be observed that a C-type thrust washer 49 is carried by the axle shaft 14 and abuts against a shoulder on the adjacent side gear 19. In this case the side thrust reaction from both vehicle wheels carried by the axle shafts 13 and 14 is contained locally within the differential. This has the advantage of permitting closer operating tolerances and applies an additional force to the clutch pressure under these operating conditions. In this instance a thrust block 50 in the form of a sleeve surrounds the pinion shaft 22 and is interposed between the ends of the axle shafts 13 and 14.

Figure 18:
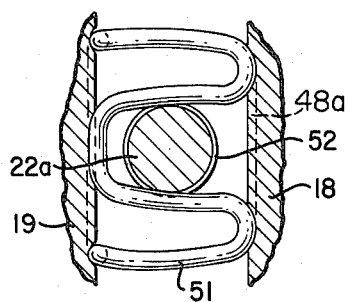
FIGURE 18 is a sectional view substantially on the line 18—18 of FIGURE 17.
Figure 17:
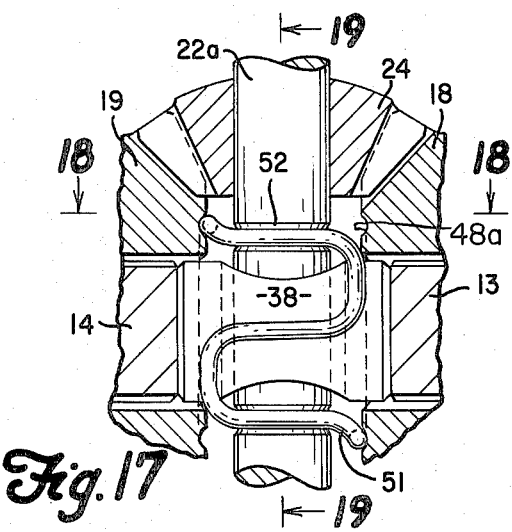
FIGURE 17 is a fragmentary sectional view of another modified form of the invention showing a multiple arch spring.
Figure 19:
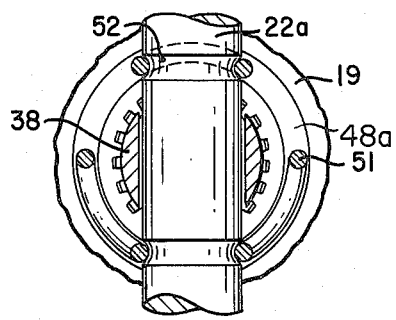
FIGURE 19 is a sectional view substantially on the line 19—19 of FIGURE 17.

In FIGURES 17 to 19 an alternate form is shown embodying a multiple arch spring 51 which embraces portions of the pinion shaft 22a which is formed with a pair of axially spaced annular grooves 52 embraced by portions of the spring 51. This structure is such as to retain the pinion shaft 22a in place and eliminates the use of a lock pin 25 or similar fastener. An advantage of this structure is that it affords better distribution of pressure on the side gears 18 and 19 and reduces the stress on the spring structure. The spring structure also is such as to afford space for a thrust block 38 for the axle shafts 13 and 14. Similar to the arrangement shown in FIGURES 14 to 16, the form of the invention according to FIG- URES 17 to 19 embraces grooves 48a in the side gears into which portions of the spring 51 seat.

From the above description it will be manifest that I have produced an exceedingly simple and economical differential having a limited and varying amount of retarding action to the location of the differential gearing for providing a large transfer ratio when a large difference in traction between the two vehicle wheels exists and automatically, a small transfer ratio when there is a small difference in the vehicle wheel traction. The ring spring in one form or another as above described is relatively inexpensive and easy to assemble and imparts the desired tension against the clutch elements. It occupies a minimum of space affording the opportunity of employing a thrust block intermediate the ends of the axle shafts. The one piece case 10 having a large access opening makes possible the employment of subassemblies which can be installed without difficulty and to which access for maintenance may be conveniently had.

Numerous changes in details of construction, arrangement and operation may be effected without departing from the spirit of the invention especially as defined in the appended claims.

What I claim is:

1. In a limited slip differential mechanism, the combination comprising a rotatable gear case, a power transmission gear train within said case and including a pair of opposed side gears each adapted for connection to and axial movement of an axle shaft, a plurality of interleaved clutch plates interposed between each side gear and said gear case, certain of said clutch plates being rotatable with and axially movable relative to each side gear and others of said clutch plates being rotatable with and axially movable in said gear case, a hub on each side gear projecting outwardly thereof, retaining bushings fixed in the gear case and providing respectively bearings for said gear hubs and retainers for said clutch discs during assembly and disassembly, and preloaded spring means exerting an equal and opposite bias on the inner faces of the side gears to force same into pressure engagement with said clutch plates.

2. In a limited slip differential mechanism, the combination comprising a rotatable gear case, a power transmission gear train within said case and including a pair of opposed side gears each adapted for connection to and axial movement of an axle shaft, a pair of pinion gears meshing with said side gears respectively, a pinion shaft common to said pinion gears, a plurality of interleaved clutch plates interposed between each side gear and said gear case, certain of said clutch plates being rotatable with and axially movable in said gear case, a self-contained spring unit exerting an equal and opposite bias on the inner faces of said side gears to force same into pressure engagement with said clutch plates respectively for maintaining same in constant engagement, said spring unit comprising a multiple loop spring partially and loosely embracing said pinion shaft, and grooves in the inner faces of said side gears for receiving and retaining adjacent portions of said spring.

3. In a limited slip differential mechanism, the combination comprising a rotatable gear case, a power transmission gear train within said case and including a pair of opposed side gears each adapted for connection to and axial movement of an axle shaft, a pair of pinion gears meshing with said side gears respectively, a pinion shaft common to said pinion gears, a plurality of interleaved clutch plates interposed between each side gear and said gear case, certain of said clutch plates being rotatable with and axially movable in said gear case, a self-contained spring unit exerting an equal and opposite bias on the inner faces of said side gears to force same into pressure engagement with said clutch plates respectively for maintaining same in constant engagement, said spring unit comprising a multiple loop spring partially and loosely embracing said pinion shaft, and grooves in the inner faces of said side gears and in the pinion shaft for receiving and retaining adjacent portions of said spring.

4. In a limited slip differential mechanism, the combination comprising a rotatable gear case, a power transmission gear train within said case and including a pair of opposed side gears each adapted for connection to and axial movement of an axle shaft, a pair of pinion gears meshing with said side gears respectively, a pinion shaft common to said pinion gears, a plurality of interleaved clutch plates interposed between each side gear and said gear case, certain of said clutch plates being rotatable with and axially movable in said gear case, a self-contained spring unit exerting an equal and opposite bias on the inner faces of said side gears to force same into pressure engagement with said clutch plates respectively for maintaining same in constant engagement, said spring unit comprising a multiple loop spring partially and loosely embracing said pinion shaft, grooves in the inner faces of said side gears for receiving and retaining adjacent portions of said spring, and a pair of axially spaced grooves in said pinion shaft engaged by portions of said spring for retaining said shaft in position.

5. In a limited slip differential mechanism, the combination comprising a rotatable gear case, a power transmission gear train within said case and including a pair of opposed side gears each adapted for connection to and axial movement of an axle shaft, a pair of pinion gears meshing with said side gears respectively, a pinion shaft common to said pinion gears, a plurality of interleaved clutch plates interposed between each side gear and said gear case, certain of said clutch plates being rotatable with and axially movable in said gear case, a ring spring preloaded to out of round condition loosely encircling said pinion shaft and bearing at one end against the end of a pinion, and a shoulder on the side gear adjacent the ring spring against which same abuts for locating same about the pinion shaft.

6. In a limited slip differential mechanism, the combination comprising a rotatable gear case, a power transmission gear train within said case and including a pair of opposed side gears, a pair of pinion gears meshing with said side gears respectively, a pair of axle shafts connected to said side gears respectively, said side gears being movable axially relative to the respective axle shafts and the adjacent ends of said axial shafts being spaced from each other, a thrust bearing block disposed between the adjacent ends of said axle shafts, a plurality of interleaved clutch plates interposed between each side gear and said gear case, certain of said clutch plates being rotatable with and axially movable in said gear case, and preloaded spring means embracing said thrust block and exerting an equal and opposite bias on the inner faces of the side gears to force same into pressure engagement with said clutch plates.

7. In a limited slip differential mechanism, the combination as claimed in claim 6 in which the preloaded spring means comprises a multiple loop spring, and grooves in the inner faces of said side gears for receiving and retaining portions of said loop spring.

References Cited by the Examiner

UNITED STATES PATENTS

| | | | |
|---|---|---|---|
| 2,525,730 | 10/50 | Schulze. | |
| 2,821,096 | 1/58 | Lyeth | 74—711 |
| 2,918,931 | 12/59 | Wildhaber | 74—710.5 |
| 2,953,076 | 9/60 | Leuschke et al. | |

FOREIGN PATENTS

| | | |
|---|---|---|
| 1,194,804 | 5/59 | France. |

DON A. WAITE, *Primary Examiner.*

BROUGHTON G. DURHAM, *Examiner.*